(12) United States Patent
Kruk et al.

(10) Patent No.: US 9,284,996 B2
(45) Date of Patent: Mar. 15, 2016

(54) SELECTIVE ELECTRICAL CONTROL OF ELECTROMECHANICAL CLUTCH ASSEMBLY

(71) Applicant: Sikorsky Aircraft Corporation, Stratford, CT (US)

(72) Inventors: Elliot Kruk, Norwalk, CT (US); William F. Lange, Woodbridge, CT (US); Michael Paul Baran, Prospect, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 90 days.

(21) Appl. No.: 14/061,373

(22) Filed: Oct. 23, 2013

(65) Prior Publication Data

US 2015/0107957 A1 Apr. 23, 2015

(51) Int. Cl.
| | |
|---|---|
| *F16D 27/12* | (2006.01) |
| *B64C 13/34* | (2006.01) |
| *F16D 27/14* | (2006.01) |
| *B64C 13/50* | (2006.01) |
| *F16D 28/00* | (2006.01) |
| *F16D 21/06* | (2006.01) |

(52) U.S. Cl.
CPC .............. *F16D 27/14* (2013.01); *B64C 13/503* (2013.01); *F16D 28/00* (2013.01); *F16D 2021/0646* (2013.01); *F16D 2500/5114* (2013.01)

(58) Field of Classification Search
CPC ............ F16D 2021/0646; F16D 27/12; F16D 2500/5114

USPC ........ 244/99.2, 99.3, 220, 221, 189; 192/48.2
See application file for complete search history.

(56) References Cited

U.S. PATENT DOCUMENTS

| | | | |
|---|---|---|---|
| 3,928,968 A | 12/1975 | Becker et al. | |
| 5,493,497 A | 2/1996 | Buus | |
| 5,806,806 A | 9/1998 | Boehringer et al. | |
| 6,419,606 B1* | 7/2002 | Tengan et al. | 475/5 |
| 6,776,376 B2* | 8/2004 | Collins | 244/213 |
| 7,044,024 B1* | 5/2006 | Younkin | 74/665 A |
| 7,551,989 B2 | 6/2009 | Knotts et al. | |
| 7,607,611 B2 | 10/2009 | Wingett et al. | |
| 8,016,243 B2 | 9/2011 | Beaufrere | |
| 8,052,096 B2 | 11/2011 | Cerchie et al. | |
| 8,336,818 B2 | 12/2012 | Flatt | |
| 8,840,507 B2* | 9/2014 | Himmelmann et al. | 475/156 |
| 2010/0213311 A1* | 8/2010 | Flatt et al. | 244/99.4 |
| 2011/0251739 A1 | 10/2011 | Tomas et al. | |
| 2012/0032031 A1 | 2/2012 | Grohmann et al. | |
| 2012/0137799 A1* | 6/2012 | Hausberg et al. | 74/89 |
| 2013/0334372 A1* | 12/2013 | Marques et al. | 244/76 R |

* cited by examiner

*Primary Examiner* — Ramya Burgess
*Assistant Examiner* — Lillian Nguyen
(74) *Attorney, Agent, or Firm* — Cantor Colburn LLP

(57) ABSTRACT

A clutch assembly of a vehicle includes a shaft configured to rotate around a rotation axis inside the shaft, a connection arm connected to the shaft, to a pilot-controlled mechanism, and to a mechanical servo that controls a movement of the vehicle, and at least two electromechanical actuators. The electromechanical actuators are configured to be selectively engaged with the shaft via an electromechanical clutch, such that the electromechanical actuators are disconnected from controlling a movement of the shaft and the connection arm when the electromechanical clutch is disengaged, and the electromechanical actuators are configured to control movement of the shaft and the connection arm when the electromechanical clutch is engaged.

4 Claims, 4 Drawing Sheets

US 9,284,996 B2

SELECTIVE ELECTRICAL CONTROL OF ELECTROMECHANICAL CLUTCH ASSEMBLY

BACKGROUND OF THE INVENTION

The subject matter disclosed herein relates to an electromechanical clutch assembly, and in particular to an electromechanical clutch assembly of a vehicle having mechanical pilot controls and electrical controls that selectively engage the electromechanical clutch to control the vehicle.

Vehicles, such as aircraft, are controlled by a pilot who provides a physical force to a control device, which physical force is transferred to a servo to control an aspect of the vehicle. In some vehicles, there is a need to control the vehicle remotely via a fly-by-wire (FBW) architecture. The FBW architecture receives electrical control signals and controls the servo based on the received electrical control signals.

BRIEF DESCRIPTION OF THE INVENTION

According to one aspect of the invention, a clutch assembly of a vehicle includes a shaft configured to rotate around a rotation axis inside the shaft, a connection arm connected to the shaft, to a pilot-controlled mechanism, and to a mechanical servo that controls a movement of the vehicle, and at least two electromechanical actuators. The electromechanical actuators are configured to be selectively engaged with the shaft via an electromechanical clutch, such that the electromechanical actuators are disconnected from controlling a movement of the shaft and the connection arm when the electromechanical clutch is disengaged, and the electromechanical actuators are configured to control movement of the shaft and the connection arm when the electromechanical clutch is engaged According to another aspect of the invention, a vehicle control assembly includes a mechanical servo configured to control movement of the vehicle, a pilot-controlled mechanism connected to the mechanical servo to control the mechanical servo, and an electromechanical clutch assembly. The electromechanical clutch assembly includes a connection arm connected to the mechanical servo, to the pilot-controlled mechanism, and to a rotation shaft. The electromechanical clutch assembly also includes a first electromechanical clutch including a first disc connected to the rotation shaft and fixed with respect to the rotation shaft and a second disc configured to be selectively engaged with the first disc. The electromechanical clutch assembly further includes a first electromechanical actuator connected to the second disc. The vehicle control assembly includes a remote control receiver connected to the first electromechanical actuator of the electromechanical clutch assembly to control a movement of the rotation shaft and the connection arm based on the first disc being engaged with the second disc, and configured to have no control of the rotation shaft and the connection arm based on the first disc being disengaged from the second disc.

Another aspect of the invention relates to a method of controlling a vehicle. The vehicle includes an electromechanical clutch assembly having a connection arm connected to each of a pilot-controlled mechanism, a servo to control a movement of the vehicle, and a rotation shaft of the electromechanical clutch assembly. The electromechanical clutch assembly further includes an electromechanical clutch and an electromechanical actuator connected to the electromechanical clutch. The method includes controlling a movement of the servo, the connection arm, and the rotation shaft with the pilot-controlled mechanism based on the electromechanical clutch being disengaged, and controlling a movement of the servo, the connection arm, and the rotation shaft with the electromechanical actuator based on the electromechanical clutch being engaged These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Conventional vehicles are controlled either by a mechanical force provided by a pilot, or by electrical signals provided from a remote receiver. Embodiments of the invention relate to a fly-by-wire (FBW) system that ties into an existing mechanical system for controlling a vehicle.

Figure 1:
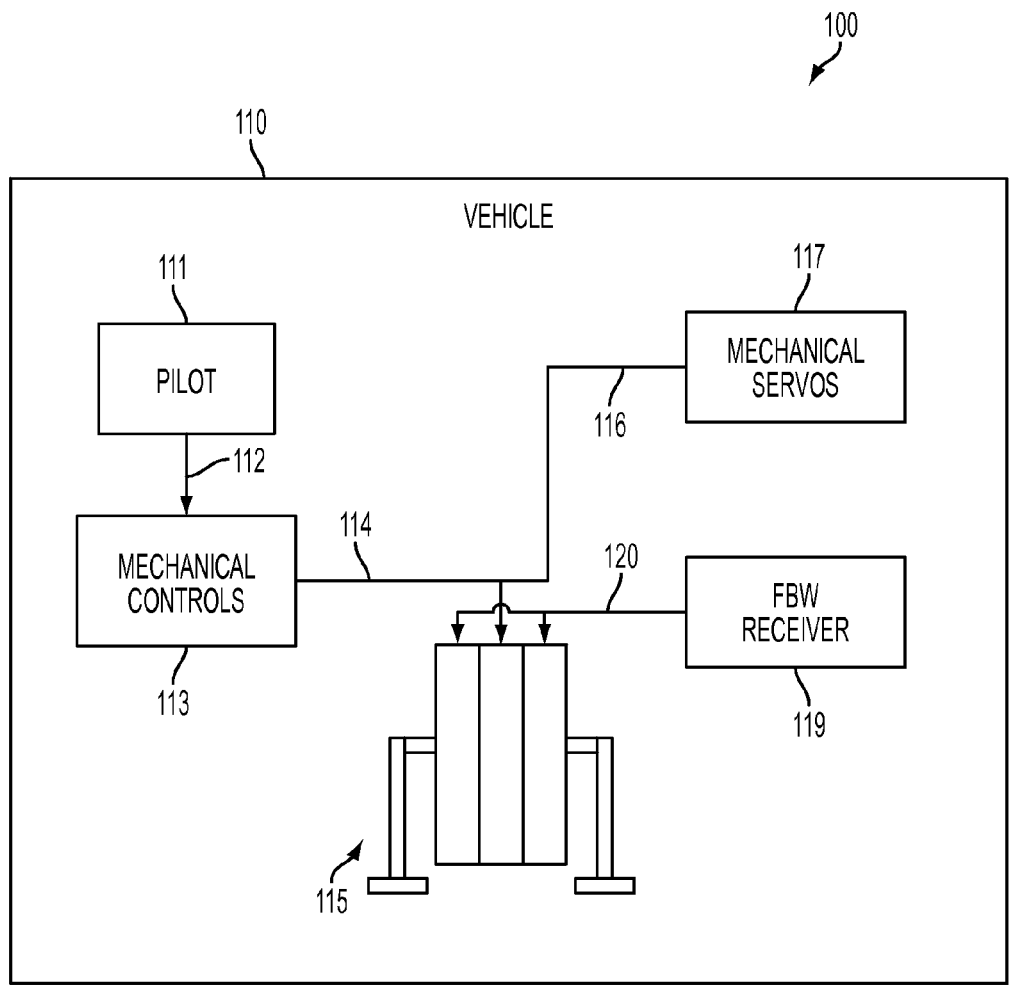
FIG. 1 illustrates an optionally-piloted vehicle system according to an embodiment of the invention.

FIG. 1 illustrates an optionally-piloted vehicle (OPV) system 100 according to an embodiment of the invention. The vehicle 110 may be an aircraft, such as a helicopter, or any other vehicle. The OPV system 100 includes the vehicle 110, which is controlled either by a pilot 111 or by a fly-by-wire (FBW) receiver 119, and an FBW remote controller 121. In one embodiment, the remote controller 121 includes a human ground operator using a wireless transmission device to transmit signals to the vehicle 110. However, embodiments also encompass a fully-automated remote controller 121, such as a computer executing a flight program.

The vehicle 110 includes mechanical controls 113 manipulated by a pilot 111 who exerts a physical force 112 on the mechanical controls 113. The vehicle 110 further includes an electromechanical clutch assembly 115 connected to the mechanical controls 113 by a mechanical connector 114, such as a rod. The electromechanical clutch assembly 115 is connected to mechanical servos 117 via a mechanical connector 116, such as a rod or multiple rods. In operation, the pilot 111 actuates the mechanical controls 113, which may include pedals, levers, wheels or any other controls. The mechanical force provided by the pilot 111 is transmitted through the mechanical system including the electromechanical clutch assembly 115 and connectors 114 and 116 to the mechanical servos 117 to control steering of the vehicle 110.

In one embodiment, the vehicle 110 is an aircraft, and the servos include flaps or other servos to control a collective, pitch, yaw, or other positional characteristic of the aircraft.

Figure 2:
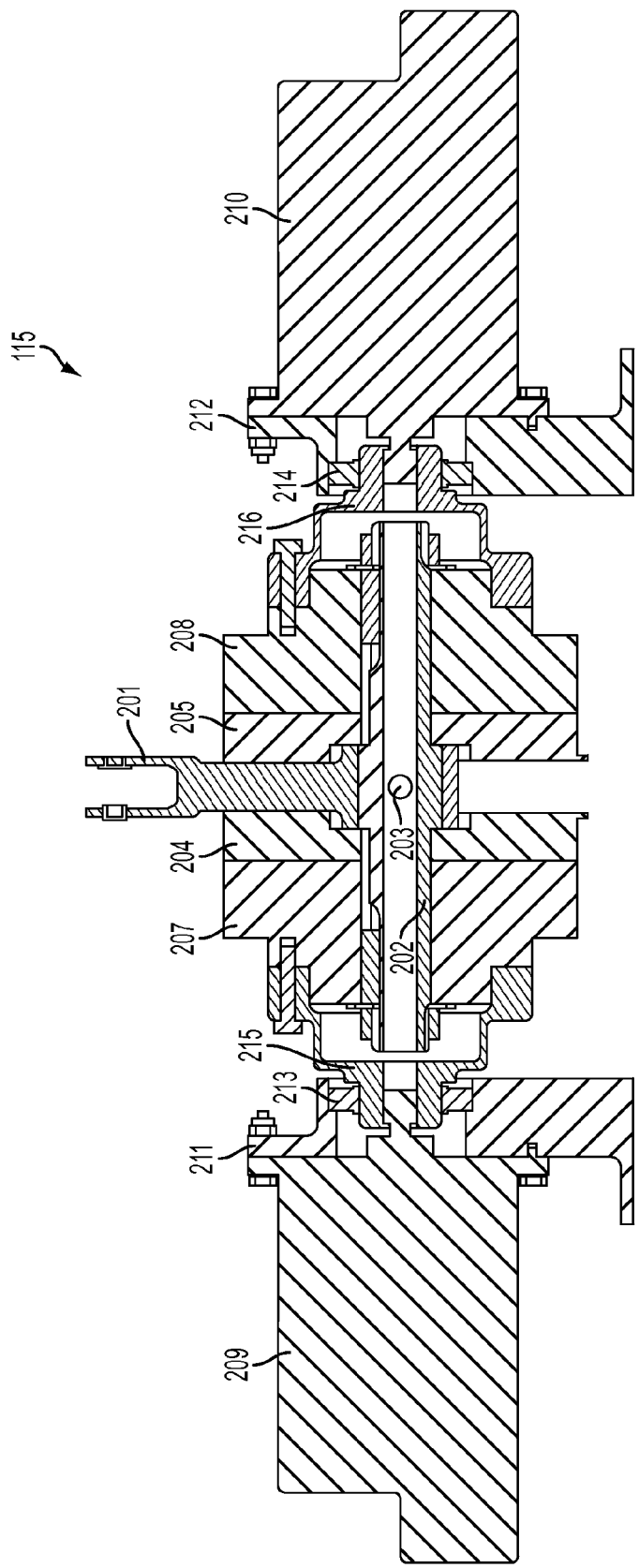
FIG. 2 illustrates an electromechanical clutch assembly according to an embodiment of the invention.

The vehicle 110 further includes a fly-by-wire (FBW) receiver 119. The FBW receiver 119 receives electrical signals from the FBW remote controller 121 and transmits aircraft control signals 120 to the electromechanical clutch 115. In embodiments of the invention, the electromechanical control signals 120 selectively engage discs of the electromagnetic clutch assembly 115, so that the mechanical servos 117 are controlled by the pilot 111 when the electromechanical clutch assembly 115 is disengaged, and the mechanical servos 117 are controlled by the vehicle control signals 120 when the electromechanical clutch assembly 115 is engaged. The electromagnetic clutch assembly 115 is illustrated in greater detail in FIG. 2.

The electromechanical clutch assembly 115 includes a connection arm 201 connected at one end to a rotation shaft 202. The opposite end of the connection arm 201 connects to a pilot-controlled mechanism to transfer a mechanical force from a pilot control device to the connection arm 201. This end of the connection arm 201 is also connected to mechanical servos that control the movement of a vehicle, such as the flight of an aircraft. A pin 203 extends through the rotation shaft 202 and the connection arm 201 to fix the connection arm 201 with respect to the rotation shaft 202. Inner discs 204 and 205 are located on both sides of the connection arm 201. The inner discs 204 and 205 extend radially outward from the rotation shaft 202, are parallel to each other, and are fixed with respect to the rotation shaft 202.

The electromechanical clutch assembly 115 further includes outer discs 207 and 208 located axially outward from the inner discs 204 and 205, respectively. The outer discs 207 and 208 selectively engage the inner discs 204 and 205, such as by electromagnetic coupling or physical coupling, to control rotation of the rotation shaft 202, and thus the connection arm 201. The electromechanical clutch assembly 115 further includes a first electromechanical actuator 209 and a second electromechanical actuator 210. The first and second electromechanical actuators 209 and 210 are configured to receive electrical signals, and in particular shaft-position control signals, and to engage the outer discs 207 and 208 with the inner discs 204 and 205 to control a rotation of the rotation shaft 202.

The first and second electromechanical actuators 209 and 210 are connected to the outer discs 207 and 208 via adapters 215 and 216, respectively. One half of each adapter 215 and 216 is bolted to the outer discs 207 and 208. The other half of each adapter 215 and 216 has a spline which mates with an output shaft of the electromechanical actuators 209 and 210. The adapters 215 and 216 transfer the rotational motion from the actuators 209 and 210 to the outer discs 207 and 208. The adapters 215 and 126 are supported by bearings 213 and 214 installed in the support brackets 211 and 212.

In operation, the inner disc 204 and the outer disc 207 make up a first electromechanical clutch, and the inner disc 205 and the outer disc 208 make up another electromechanical clutch. The electromechanical clutches 204/207 and 205/208 operate such that when electrical power is supplied to the electromechanical clutches 204/207 and 205/208, the electromechanical clutches 204/207 and 205/208 are engaged. In one embodiment, only one of the electromechanical clutches 204/207 and 205/208 will be engaged at a time, and the other one of the electromechanical clutches 204/207 and 205/208 will be reserved as a back-up in case of failure of the primary electromechanical clutches 204/207 or 205/208.

When the clutch is engaged the inner plate 204 or 205 is connected to the outer plate 207 or 208. When the plates are connected, the clutch transmits rotational force between the inner plate 204 or 205 and the outer plate 207 or 208. When electrical power is removed, the clutch is disengaged. When the clutch is disengaged the inner plate 204 or 205 is not connected to the outer plate 207 or 208. When the plates are not connected, the plates rotate independently and do not transmit any rotational force between the inner plate and the outer plate.

The engagement of the electromechanical clutches 204/207 and 205/208 is controlled by the FBW receiver 119 illustrated in FIG. 1. Alternatively, a pilot or other user may generate a control signal to set the vehicle in a remote-controlled mode. The FBW receiver 119 supplies power to the electromechanical clutches 204/207 and 205/208 depending on whether the pilot wants to control the vehicle 110 or whether the FBW receiver 119 will control the vehicle 110. The FBW receiver 119 also provides control signals to the electromechanical actuators 209 and 210 to control vehicle-control servos. When one or both of the electromechanical clutches 204/207 and 205/208 are engaged, the vehicle is operated based on the control signals from the electromechanical actuators 209 and 210. When both of the electromechanical clutches 204/207 and 205/208 are disengaged, the pilot controls the vehicle, and the inner discs 204 and 205 of the electromechanical clutches 204/207 and 205/208 rotated independently of the outer discs 207 and 208.

In embodiments of the invention, the terms "engage" and "disengage" refer to applying an electromagnetic coupling or a physical force to cause the inner discs 204 and 205 to rotate together with the outer discs 207 and 208. Since the pilot is able to control the rotation shaft 202 and mechanical servos to control the position of the vehicle when no power is supplied to the clutch assembly 115, a loss of power to the electromechanical clutch assembly 115 does not result in loss of control of the vehicle. Instead, the pilot is able to regain or maintain control of the vehicle.

In one embodiment, the first and second electromechanical clutches 204/207 and 205/208 and the first and second electromechanical actuators 209 and 210 are configured to be redundant. In other words, each of the first and second electromechanical actuators 209 and 210 may receive the same rotation shaft position control signal to control the position of the rotation shaft 202. If both of the electromechanical actuators 209 and 210 are operational and both of the electromechanical clutches 204/207 and 205/208 are operational and one or both of the electromechanical clutches 204/207 and 205/208 are engaged, one or both of the electromechanical actuators 209 and 210 may receive vehicle control signals which are transmitted to the shaft 202 via the electromechanical clutches 204/207 and 205/208 to control movement of the vehicle.

However, if one of the electromechanical actuators 209 and 210 is faulty, or if one of the electromechanical clutches 204/207 and 205/208 is faulty, the other electromechanical actuator 209 and 210 and electromechanical clutch 204/207 or 205/208 may still control the vehicle.

Figure 3:
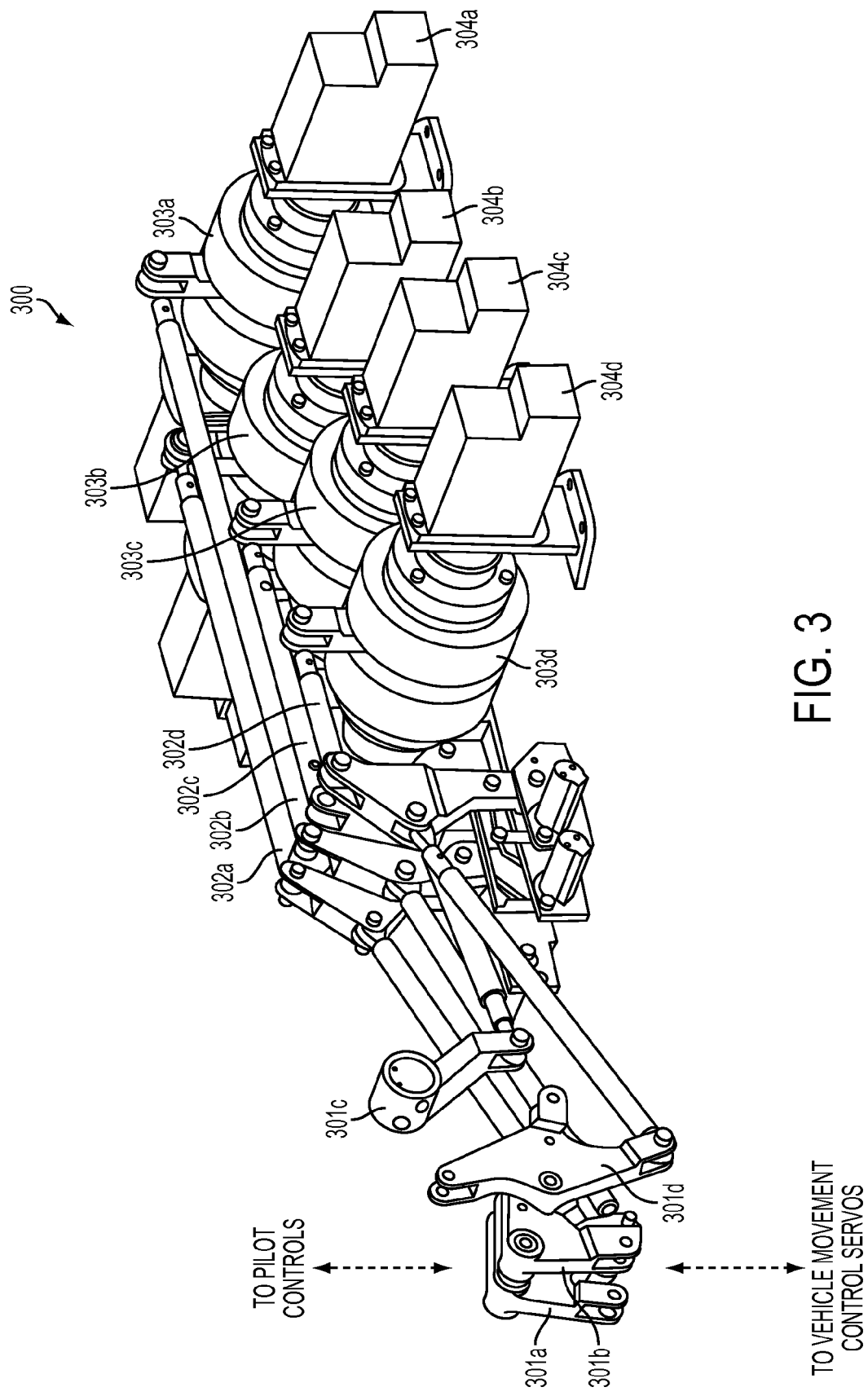
FIG. 3 illustrates an electromechanical clutch assembly connected to pilot controls according to an embodiment of the invention.

FIG. 3 illustrates a servo control assembly 300 including the connections between electromechanical clutches and pilot-controlled devices according to embodiments of the invention. The servo control assembly 300 includes mechanical levers 301a, 301b, 301c, and 301d which are connected to pilot-controlled mechanisms (not shown), to mechanical vehicle-movement control servos (not shown) that control movement of the vehicle, and to the electromechanical clutches 303a, 303b, 303c, and 303d via mechanical force-transfer mechanisms 302a, 302b, 302c, and 302d, including rods, levers, and any other mechanical devices for transferring a force. Electromechanical actuators 304a, 304b, 304c, and 304d engage and disengage the electromechanical clutches 303a-303d to toggle control of the vehicle-movement servos between the electromechanical actuators 304a-

304d, which are in-turn controlled by a remote system, such as a fly-by-wire system, and the pilot controls (not shown). While a set of four electromechanical clutches 303a to 303d is illustrated, embodiments of the invention encompass any number of mechanical control devices and any number of electromechanical clutches.

Figure 4:
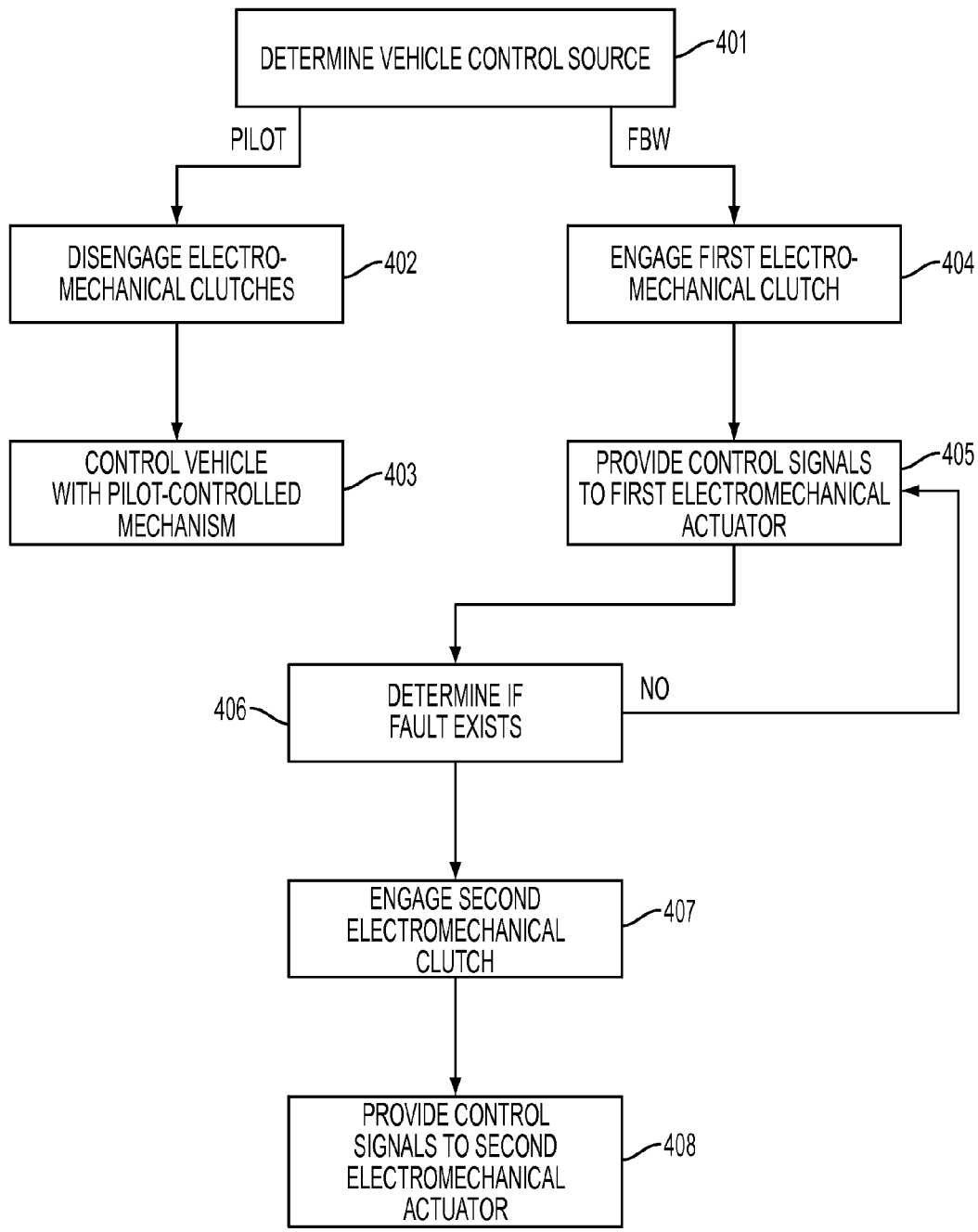
FIG. 4 is a flow diagram of a method of controlling a vehicle according to an embodiment of the invention.

FIG. 4 is a flow diagram of a method for controlling a vehicle according to an embodiment of the invention. In block 401, a vehicle control source is determined In one embodiment, a pilot of the vehicle controls the vehicle unless a remote signal (referred to in FIG. 4 as FBW) is received to over-ride the pilot controls. In another embodiment, the FBW signal controls the vehicle unless the FBW system fails or is disengaged, in which case the pilot controls the vehicle. In block 402, if it is determined that the pilot is to control the vehicle, an electromagnetic clutch that connects the FBW system to the flight control servos is disengaged. In block 403, the vehicle is controlled by a pilot-controlled mechanism in the vehicle.

If it is determined that the FBW signal is to control the vehicle, a first electromagnetic clutch is engaged in block 404, and control signals are provided to a first electromechanical actuator in block 405. The electromechanical actuator is connected to an
FBW receiver, so that the FBW system controls the movement of the vehicle.

In block 406, it is determined whether there is a fault in one or both of the first electromechanical clutch and the first electromechanical actuator. For example, it may be determined that there is a mechanical jam, erratic responses, responses outside an acceptable range of accuracy, or any other type of fault. If no fault is detected then the control signals continue to be routed to the first electromechanical actuator.

However, if a fault is detected, then in block 407 a second electromechanical clutch is engaged, and in block 408, control signals are provided to a second electromechanical actuator connected to the second electromechanical clutch to control movement of the vehicle. In addition, if it is determined that both electromechanical clutches have failed, the pilot may still control the vehicle by disengaging the electromechanical clutches.

According to embodiments of the invention, servos that control position characteristics of a vehicle, such as yaw, pitch and collective characteristics are selectively controlled by either a pilot or by electrical signals, such as fly-by-wire (FBW) control signals. The FBW control signals may control electromechanical actuators that are part of a mechanical system for controlling servos that control movement of a vehicle, such that the electrical signals are tied into the mechanical system including mechanical pilot control devices. The electromechanical clutches may be engaged to permit control of the vehicle by a fly-by-wire system via electromechanical actuators when power is supplied to the clutches and disengaged when power is not supplied to the clutches, or when the power to the clutches or to the electromechanical actuators fails. In either event, the pilot is able to control the vehicle, since the electromechanical clutches are disengaged and any movement of the actuators is not passed through the clutches to the vehicle-controlling servos.

Embodiments of the invention encompass electromechanical clutches and clutch assemblies, mechanical control assemblies for controlling vehicles, and vehicles including the mechanical control assemblies.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A clutch assembly of a vehicle, comprising:
a shaft configured to rotate around a rotation axis inside the shaft;
a connection arm connected to the shaft, to a pilot-controlled mechanism, and to a mechanical servo that controls a movement of the vehicle; and
a first electromechanical actuator configured to be selectively mechanically engaged with the shaft via a first electromechanical clutch and a second electromechanical actuator configured to be selectively mechanically engaged with the shaft via a second electromechanical clutch, such that the first and second electromechanical actuators are disconnected from controlling a movement of the shaft and the connection arm when the first and second electromechanical clutches are disengaged, and one of the first and second electromechanical actuators is configured to control movement of the shaft and the connection arm when one of the first and second electromechanical clutches is engaged, the first electromechanical actuator and second electromechanical actuator configured in a redundant configuration, such that each of the first electromechanical actuator and second electromechanical actuator is configured to engage the shaft based on receiving a shaft-position control signal, the first electromechanical clutch configured to be disengaged based on the second electromechanical clutch being engaged, the first electromechanical clutch configured to be engaged based on a failure being detected in at least one of the second electromechanical actuator and the second electromechanical clutch.

2. The clutch assembly of claim 1, wherein the first electromechanical actuator and second electromechanical actuator are located at opposite ends of the shaft.

3. The clutch assembly of claim 1, wherein the first electromechanical clutch includes a first inner disc configured to selectively engage a first outer disc and the second electromechanical clutch includes a second inner disc configured to selectively engage a second outer disc.

4. A method of controlling a vehicle, the vehicle including an electromechanical clutch assembly having a connection arm connected to each of a pilot-controlled mechanism, a servo to control a movement of the vehicle, and a rotation shaft of the electromechanical clutch assembly, the electromechanical clutch assembly further including an electromechanical clutch and an electromechanical actuator mechanically connected to the electromechanical clutch, the method comprising:
controlling a movement of the servo, the connection arm, and the rotation shaft with the pilot-controlled mechanism based on the electromechanical clutch being disengaged; and
controlling a movement of the servo, the connection arm, and the rotation shaft with the electromechanical actuator based on the electromechanical clutch being engaged;

wherein the electromechanical clutch assembly further includes an auxiliary electromechanical clutch connected to the rotation shaft and an auxiliary electromechanical actuator mechanically connected to the auxiliary electromechanical clutch, the method further comprising:

detecting a fault in at least one of the electromechanical clutch and the electromechanical actuator;

engaging the auxiliary electromechanical clutch based on detecting the fault in at least one of the electromechanical clutch and the electromechanical actuator; and transmitting control signals to the auxiliary electromechanical actuator to control a movement of the vehicle based on the auxiliary clutch being engaged.

* * * * *